United States Patent
Watanabe et al.

(10) Patent No.: US 8,052,952 B2
(45) Date of Patent: Nov. 8, 2011

(54) COMPOSITE AND METHOD OF MANUFACTURING THE SAME

(75) Inventors: Miho Watanabe, Nakai-machi (JP);
Kentaro Kishi, Nakai-machi (JP);
Chikara Manabe, Nakai-machi (JP);
Kazunori Anazawa, Nakai-machi (JP);
Masaki Hirakata, Nakai-machi (JP);
Taishi Shigematsu, Nakai-machi (JP);
Hiroyuki Watanabe, Nakai-machi (JP);
Takashi Isozaki, Nakai-machi (JP);
Shigeki Ooma, Nakai-machi (JP);
Shinsuke Okada, Nakai-machi (JP)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 12/656,496

(22) Filed: Feb. 1, 2010

(65) Prior Publication Data
US 2010/0137502 A1    Jun. 3, 2010

Related U.S. Application Data

(62) Division of application No. 10/935,244, filed on Sep. 8, 2004, now Pat. No. 7,695,769.

(30) Foreign Application Priority Data

Oct. 9, 2003 (JP) .................. 2003-350826
Jun. 16, 2004 (JP) .................. 2004-178468

(51) Int. Cl.
*D01F 9/12* (2006.01)
*C09C 1/56* (2006.01)
(52) U.S. Cl. ..................... 423/460; 423/447.1
(58) Field of Classification Search ............. None
See application file for complete search history.

(56) References Cited

U.S. PATENT DOCUMENTS

5,691,054 A    11/1997   Tennent et al.
6,426,134 B1    7/2002   Lavin et al.
6,630,772 B1   10/2003   Bower et al.
(Continued)

FOREIGN PATENT DOCUMENTS

EP    0 287 138 A1    10/1988
(Continued)

OTHER PUBLICATIONS

Lin et al., Macromolecules, (2003), vol. 36, p. 7199-7204.*

*Primary Examiner* — Angela Ortiz
*Assistant Examiner* — Brett A Crouse
(74) *Attorney, Agent, or Firm* — Oliff & Berridge, PLC (57) ABSTRACT

Provided is a nanotube-polymer composite which can effectively utilize characteristics of a carbon nanotube structure. The composite includes a carbon nanotube structure and a polymer, in which: the carbon nanotube structure has a network structure constructed by mutually cross-linking functional groups bonded to multiple carbon nanotubes through chemical bonding of the functional groups together; and the polymer is filled in the network structure. Also provided is a method of manufacturing a composite which includes the steps of: supplying a base body surface with a solution containing multiple carbon nanotubes to which multiple functional groups are bonded; mutually cross-linking the multiple carbon nanotubes through chemical bonding of the multiple functional groups together to construct a network structure constituting a carbon nanotube structure; impregnating the network structure with a polymer liquid forming a polymer; and combining the carbon nanotube structure and the polymer by curing the polymer liquid.

4 Claims, 4 Drawing Sheets

U.S. PATENT DOCUMENTS

| | | |
|---|---|---|
| 6,673,136 B2 | 1/2004 | Gillingham et al. |
| 6,682,677 B2 | 1/2004 | Lobovsky et al. |
| 2002/0176650 A1 | 11/2002 | Zhao et al. |
| 2003/0086858 A1 | 5/2003 | Niu et al. |
| 2006/0217482 A1 | 9/2006 | Lukehart et al. |
| 2008/0275177 A1 | 11/2008 | Chu et al. |

FOREIGN PATENT DOCUMENTS

| | | |
|---|---|---|
| EP | 0 456 465 A1 | 11/1991 |
| JP | A-7-102112 | 4/1995 |
| JP | A-2002-346996 | 12/2002 |
| JP | A-2003-201405 | 7/2003 |
| JP | A-2004-526838 | 9/2004 |
| JP | A-2004-315253 | 11/2004 |
| WO | WO 97/32571 | 9/1997 |
| WO | WO 99/23287 A | 5/1999 |
| WO | WO 00/24816 A | 5/2000 |
| WO | WO 00/43446 A | 7/2000 |
| WO | WO 01/70866 A2 | 9/2001 |
| WO | WO 02/060812 A2 | 8/2002 |
| WO | WO 02/098969 A1 | 12/2002 |
| WO | WO 02/098991 A1 | 12/2002 |
| WO | WO 03/038837 A1 | 5/2003 |

* cited by examiner

REACTION SCHEME FOR INTRODUCING CARBOXYLIC GROUP TO CARBON NANOTUBE

Fig. 3

REACTION SCHEME FOR METHYL ESTERIFICATION OF CARBON NANOTUBE CARBOXYLIC ACID

Fig. 4

REACTION SCHEME FOR POLYMERIZATION OF CARBON NANOTUBE CARBOXYLIC ACID METHYL ESTER AND GLYCERIN BY ESTER EXCHANGE

COMPOSITE AND METHOD OF MANUFACTURING THE SAME

This is a Division of application Ser. No. 10/935,244 filed on Sep. 8, 2004. The disclosure of the prior application is hereby incorporated by reference in its entirety.

FIELD OF THE INVENTION AND RELATED ART STATEMENT

The present invention relates to a composite of a carbon nanotube structure and a polymer that are combined (hereinafter, may be referred to as a nanotube-polymer composite) and a method of manufacturing the same.

Carbon nanotubes (CNTs), with their unique shapes and characteristics, may find various applications. A carbon nanotube has a tubular shape of one-dimensional nature which is obtained by rolling one or more graphene sheets composed of six-membered rings of carbon atoms into a tube. A carbon nanotube formed from one graphene sheet is called a single-wall carbon nanotube (SWNT) while a carbon nanotube formed from multiple graphene sheets is called a multi-wall carbon nanotube (MWNT). SWNTs are about 1 nm in diameter whereas multi-wall carbon nanotubes are several tens nm in diameter, and both are far thinner than their predecessors, which are called carbon fibers.

One of the characteristics of carbon nanotubes resides in that the aspect ratio of length to diameter is very large since the length of carbon nanotubes is on the order of micrometers. Carbon nanotubes are unique in their extremely rare nature of being both metallic and semiconductive because six-membered rings of carbon atoms in carbon nanotubes are arranged into a spiral. In addition, the electrical conductivity of carbon nanotubes is very high and allows a current flow at a current density of 100 $MA/cm^2$ or more.

Carbon nanotubes excel not only in electrical characteristics but also in mechanical characteristics. That is, the carbon nanotubes are distinctively tough, as attested by their Young's moduli exceeding 1 TPa, which belies their extreme lightness resulting from being formed solely of carbon atoms. In addition, the carbon nanotubes have high elasticity and resiliency resulting from their cage structure. Having such various and excellent characteristics, carbon nanotubes are very appealing as industrial materials.

Applied researches that exploit the excellent characteristics of carbon nanotubes have been heretofore made extensively. To give a few examples, a carbon nanotube is added as a resin reinforcer or as a conductive composite material while another research uses a carbon nanotube as a probe of a scanning probe microscope. Carbon nanotubes have also been used as minute electron sources, field emission electronic devices, and flat displays. An application that is being developed is to use a carbon nanotube as a hydrogen storage.

As described above, carbon nanotubes may find use in various applications and have been recently used as a filler for a polymer resin used in various materials. Various fillers heretofore have been added to a polymer for imparting functions such as electrical conductivity, physical strength, and flame retardance.

An electrically conductive filler such as carbon black, carbon fibers, or metal oxides has been mixed with a polymer such as polycarbonate or with an elastomer such as butadiene rubber for imparting electrical conductivity, for example. Increasing an amount of an electrically conductive material mixed for imparting high electrical conductivity has caused problems including deterioration of moldability and significant deterioration of physical characteristics such as impact strength.

A vapor grown carbon fibers, a carbon nanotube, or the like has been recently mixed with a resin for solving such problems (see JP 07-102112 A, for example).

A carbon nanotube has higher electrical conductivity compared to that of a conventional carbon-based electrically conductive filler. A carbon nanotube also has a high aspect ratio and easily forms a network structure in a resin, and thus is very fine and includes many carbon nanotubes form per unit weight. Thus, mixing of a carbon nanotube with a resin in an amount comparable to that of the conventional carbon-based electrically conductive filler provides a resin composition having higher electrical conductivity.

However, the carbon nanotubes form an aggregate or entanglement in the resin through the above method, and the method had problems that uniform dispersion of the nanotubes and increase in a filling amount (density) of the nanotubes are difficult. As a result, problems arouse in that electrical conductivity was not uniform, and that a resin composition having stable electrical conductivity could not be obtained.

SUMMARY OF THE INVENTION

The present invention has been made to solve the above problems of the prior art and specifically provides a nanotube-polymer composite which can effectively utilize characteristics of a carbon nanotube.

In order to solve the above problems, a composite of the present invention includes a carbon nanotube structure and a polymer, in which: the carbon nanotube structure has a network structure constructed by mutually cross-linking functional groups bonded to multiple carbon nanotubes through chemical bonding of the functional groups together; and the polymer is filled in the network structure.

The carbon nanotube structure has a network structure consisting solely of carbon nanotubes, that is, mutually cross-linked carbon nanotubes. A composite is formed by impregnating the network structure of the carbon nanotubes with a polymer liquid and curing the polymer liquid. Thus, a network of the carbon nanotubes is assuredly formed in the polymer, and a resin composition having stable electrical conductivity can be obtained.

The nanotube-polymer composite of the present invention employs a carbon nanotube structure in which multiple carbon nanotubes construct a network structure through multiple cross-linked sites. As a result, unlike the case where carbon nanotubes are merely filled in a polymer, stable electrical characteristics and mechanical characteristics are provided regardless of a contact state of entanglement of the carbon nanotubes. Further, localization of the nanotubes in the composite due to easily caused aggregation of the separated nanotubes and low dispersion is prevented, thereby providing a more homogeneous structure. As a result, an effect of filling the carbon nanotubes can be provided more uniformly.

According to the present invention, the polymer may include various resins such as polyethylene, polypropylene, polyvinyl chloride, polyamide, polyimide, and an epoxy resin.

Among the polymers, an elastomer such as butadiene rubber, acrylic rubber, or isoprene rubber is preferable in view of ease of processability, effect of enhancing mechanical strength of the composite, and affinity with the carbon nanotubes.

The carbon nanotube structure is preferably obtained by curing a solution containing multiple carbon nanotubes to which multiple functional groups are bonded, to thereby form a cross-linked site through chemical bonding of the multiple functional groups bonded to the carbon nanotubes.

Of those, a preferable first structure for the cross-linked site has a structure constructed by cross-linking the multiple functional groups together through a cross-linking agent in the solution, and the cross-linking agent is more preferably not self-polymerizable.

By forming the carbon nanotube structure through the above curing of the solution, the cross-linked site where the carbon nanotubes are cross-linked together has a cross-linking structure in which residues of the functional groups remaining after a cross-linking reaction are connected together using a connecting group which is a residue of the cross-linking agent remaining after the cross-linking reaction.

If the cross-linking agent has a property of polymerizing with other cross-linking agents (self-polymerizability), the connecting group may contain a polymer in which two or more cross-linking agents are connected, thereby reducing an actual density of the carbon nanotubes in the carbon nanotube structure. Therefore, sufficient electrical conductivity and mechanical strength may not be provided as an electrically conductive material.

On the other hand, a non self-polymerizable cross-linking agent allows control of a gap between each of the carbon nanotubes to a size of a cross-linking agent residue used. Therefore, a desired network structure of carbon nanotubes can be obtained with high duplicability. Further, reducing the size of the cross-linking agent residue can extremely narrow a gap between each of the carbon nanotubes electrically and physically. In addition, carbon nanotubes in the structure can be densely structured.

Therefore, a non self-polymerizable cross-linking agent can provide the carbon nanotube structure according to the present invention exhibiting the electrical characteristics and physical characteristics of a carbon nanotube itself at high levels.

In the present invention, the term "self-polymerizable" refers to property with which the cross-linking agents may prompt a polymerization reaction with each other in the presence of other components such as water or in the absence of other components. On the other hand, the term "not self-polymerizable" means that the cross-linking agent has no such property.

A selection of a non self-polymerizable cross-linking agent as the cross-linking agent provides a cross-linked site, where carbon nanotubes in the composite of the present invention are cross-linked together, having primarily an identical cross-linking structure. Furthermore, the connecting group preferably has hydrocarbon as its skeleton, and the hydrocarbon preferably has 2 to 10 carbon atoms. Reducing the number of carbon atoms can shorten the length of a cross-linked site and sufficiently narrow a gap between carbon nanotubes as compared to the length of a carbon nanotube itself. As a result, a carbon nanotube structure having a network structure composed substantially only of carbon nanotubes can be obtained.

Examples of the functional group include —OH, —COOH, —COOR (where R represents a substituted or unsubstituted hydrocarbon group), —COX (where X represents a halogen atom), —NH$_2$, and —NCO. A selection of at least one functional group from the group consisting of the above functional groups is preferable, and in such a case, a cross-linking agent, which may prompt a cross-linking reaction with the selected functional group, is selected as the cross-linking agent.

Further, examples of the preferable cross-linking agent include a polyol, a polyamine, a polycarboxylic acid, a polycarboxylate, a polycarboxylic acid halide, a polycarbodiimide, and a polyisocyanate. A selection of at least one cross-linking agent from the group consisting of the above cross-linking agents is preferable, and in such a case, a functional group, which may prompt a cross-linking reaction with the selected cross-linking agent, is selected as the functional group.

At least one functional group and at least one cross-linking agent are preferably selected respectively from the group consisting of the functional groups exemplified as the preferable functional groups and the group consisting of the cross-linking agents exemplified as the preferable cross-linking agents, so that a combination of the functional group and the cross-linking agent may prompt a cross-linking reaction with each other.

Examples of the particularly preferable functional group include —COOR (where R represents a substituted or unsubstituted hydrocarbon group). Introduction of a carboxyl group into carbon nanotubes is relatively easy, and the resultant substance (carbon nanotube carboxylic acid) has high reactivity. Therefore, after the formation of the substance, it is relatively easy to esterify the substance to convert its functional group into —COOR (where R represents a substituted or unsubstituted hydrocarbon group). The functional group easily prompts a cross-linking reaction and is suitable for formation of a carbon nanotube structure.

A polyol can be exemplified as the cross-linking agent corresponding to the functional group. A polyol is cured by a reaction with —COOR (where R represents a substituted or unsubstituted hydrocarbon group), and forms a robust cross-linked substance with ease. Among polyols, each of glycerin and ethylene glycol reacts with the above functional groups well. Moreover, each of glycerin and ethylene glycol itself is highly biodegradable, and provides a low environmental load.

In the cross-linked site where multiple carbon nanotubes are mutually cross-linked, the functional group is —COOR (where R represents a substituted or unsubstituted hydrocarbon group). The cross-linked site is —COO(CH$_2$)$_2$OCO— in the case where ethylene glycol is used as the cross-linking agent. In the case where glycerin is used as the cross-linking agent, the cross-linked site is —COOCH$_2$CHOHCH$_2$OCO— or —COOCH$_2$CH(OCO—)CH$_2$OH if two OH groups contribute to the cross-linking, and the cross-linked site is —COOCH$_2$CH(OCO—)CH$_2$OCO— if three OH groups contribute to the cross-linking. The chemical structure of the cross-linked site may be any chemical structure selected from the group consisting of the above four structures.

A second structure preferable as the structure of the cross-linked site of carbon nanotubes is a structure formed through chemical bonding of multiple functional groups together. More preferably, a reaction that forms the chemical bonding is any one of dehydration condensation, a substitution reaction, an addition reaction, and an oxidative reaction.

The carbon nanotube structure of this case forms a cross-linked site by chemically bonding together functional groups bonded to the carbon nanotubes, to thereby form a network structure. Therefore, the size of the cross-linked site for bonding the carbon nanotubes together becomes constant depending on the functional group to be bonded. Since a carbon nanotube has an extremely stable chemical structure, there is a low possibility that functional groups or the like other than a functional group to modify the carbon nanotube are bonded to the carbon nanotube. In the case where the functional groups are chemically bonded together, the designed structure of the cross-linked site can be obtained, thereby providing a homogeneous carbon nanotube structure.

Furthermore, the functional groups are chemically bonded together, so that the length of the cross-linked site between the carbon nanotubes can be shorter than that in the case where the functional groups are cross-linked together with a cross-linking agent. Therefore, the carbon nanotube structure is dense, and an effect peculiar to a carbon nanotube is easily provided.

In addition, multiple carbon nanotubes construct a network structure through multiple cross-linked sites in the carbon nanotube structure of the present invention. As a result, excellent characteristics of a carbon nanotube can be stably used unlike a material such as a mere carbon nanotube dispersion film or resin dispersion film in which carbon nanotubes are only accidentally in contact with each other and are substantially isolated from each other.

The chemical bonding of the multiple functional groups together is preferably one selected from —COOCO—, —O—, —NHCO—, —COO—, and —NCH— in a condensation reaction. The chemical bonding is preferably at least one selected from —NH—, —S—, and —O— in a substitution reaction. The chemical bonding is preferably —NH-COO— in an addition reaction. The chemical bonding is preferably —S—S— in an oxidative reaction.

Examples of the functional group to be bonded to a carbon nanotube prior to the reaction include —OH, —COOH, —COOR (where R represents a substituted or unsubstituted hydrocarbon group), —X, —COX (where X represents a halogen atom), —SH, —CHO, —$OSO_2CH_3$, —$OSO_2(C_6H_4)CH_3$, —$NH_2$, and —NCO. It is preferable to select at least one functional group from the group consisting of the above functional groups.

Particularly preferable examples of the functional group include —COOH. A carboxyl group can be relatively easily introduced into a carbon nanotube. In addition, the resultant substance (carbon nanotube carboxylic acid) has high reactivity, easily prompts a condensation reaction by using a dehydration condensation agent such as N-ethyl-N'-(3-dimethylaminopropyl)carbodiimide, and thus is suitable for forming a carbon nanotube structure.

The multiple carbon nanotubes are each particularly preferably a multi-wall carbon nanotube having high electrical conductivity for enhancing electrical conductivity of the nanotube-polymer composite and for hardly deteriorating the characteristics of a carbon nanotube because an inner graphene sheet structure is destroyed only to a small extent when functional groups are bonded.

(Manufacturing Method)

Next, a method of manufacturing a nanotube-polymer composite of the present invention includes the steps of: supplying a base body surface with a solution containing multiple carbon nanotubes to which multiple functional groups are bonded; mutually cross-linking the multiple carbon nanotubes through chemical bonding of the multiple functional groups together to construct a network structure constituting a carbon nanotube structure; impregnating the network structure with a polymer liquid; and combining the carbon nanotube structure and the polymer by curing the polymer liquid.

According to the present invention, in the step of supplying the base body surface with a solution containing carbon nanotubes to which multiple functional groups are bonded (hereinafter, simply referred to as "cross-linking solution" or "cross-linking application solution" in some cases), a structure (in the form of a film, a layer, a block, or the like) is first formed with the cross-linking solution on the entirety or a part of the surface of the base body. Then, in the subsequent cross-linking step, the thus supplied structure is cured to form a carbon nanotube structure in which the multiple carbon nanotubes are mutually cross-linked through chemical bonding of the multiple functional groups together to construct a network structure. The above two steps can stabilize the structure itself of the carbon nanotube structure on the surface of the base body.

Subsequently, the carbon nanotube structure and the polymer are combined by impregnating the network structure of the carbon nanotube structure thus formed with the polymer liquid and curing the polymer liquid. Gaps in the network structure do not have to be completely filled with the polymer, and a level of filling may be determined according to use.

An example of the impregnation method employed at this time is: a method of impregnating specific portions through dropping, application, or the like of a polymer liquid, or a method of dipping a base body supporting a carbon nanotube structure in a polymer liquid. Another example thereof is a method of dispersing a carbon nanotube structure itself in a polymer liquid after the carbon nanotube structure and the base body are separated. The former method forms a composite in an area comparable to a surface area of the base body, and thus is suitable for formation of a composite having a relatively small area. The latter method involves dispersion of the carbon nanotube structure after the structure is separated from the base body, and thus is suitable for formation of a large composite.

Examples of the polymer include various resins such as polyethylene, polypropylene, polyvinyl chloride, polyamide, polyimide, and an epoxy resin.

Among the polymers, an elastomer such as butadiene rubber, acrylic rubber, or isoprene rubber is preferably used.

However, the polymer is selected in view of affinity between the carbon nanotube and the polymer. A surface of the carbon nanotube is hydrophobic, and thus a hydrophobic polymer is preferable. Specific examples of the hydrophobic polymer include polyethylene, polypropylene, and polyvinyl chloride.

Next, a method of forming the carbon nanotube structure will be described. In forming chemical bonding between functional groups, a first method preferable for forming a cross-linked site is a method of cross-linking the multiple functional groups with a cross-linking agent in the solution. More preferably, the cross-linking agent is not self-polymerizable.

In the method of manufacturing a nanotube-polymer composite of the present invention, examples of the functional groups for forming a cross-linked site by using a cross-linking agent include —OH, —COOH, —COOR (where R represents a substituted or unsubstituted hydrocarbon group), —COX (where X represents a halogen atom), —$NH_2$, and —NCO. It is preferable to select at least one functional group from the group consisting of the above functional groups. In such a case, a cross-linking agent, which may prompt a cross-linking reaction with the selected functional group, is selected as the cross-linking agent.

Further, preferable examples of the cross-linking agent include a polyol, a polyamine, a polycarboxylic acid, a polycarboxylate, a polycarboxylic acid halide, a polycarbodiimide, and a polyisocyanate. It is preferable to select at least one cross-linking agent from the group consisting of the above cross-linking agents. In such a case, a functional group, which may prompt a cross-linking reaction with the selected cross-linking agent, is selected as the functional group.

The at least one functional group and the at least one cross-linking agent are preferably selected respectively from the group consisting of the functional groups exemplified as the preferable functional groups and the group consisting of the cross-linking agents exemplified as the preferable cross-linking agents, such that a combination of the functional group and the cross-linking agent thus selected may prompt a mutual cross-linking reaction.

Particularly preferable examples of the functional group include —COOR (where R represents a substituted or unsubstituted hydrocarbon group). A carboxyl group can be introduced into a carbon nanotube with relative ease, and the resultant substance (carbon nanotube carboxylic acid) has high reactivity. Therefore, it is relatively easy to esterify the substance to convert its functional group into —COOR (where R represents a substituted or unsubstituted hydrocarbon group) after the formation of the substance. The functional group easily prompts a cross-linking reaction, and is suitable for the formation of a carbon nanotube structure.

In addition, a polyol can be exemplified as the cross-linking agent corresponding to the functional group. A polyol is cured by a reaction with —COOR (where R represents a substituted or unsubstituted hydrocarbon group) to easily form a robust cross-linked substance. Among polyols, each of glycerin and ethylene glycol reacts with the above functional groups well. Moreover, each of glycerin and ethylene glycol itself is highly biodegradable, and provides a low environmental load.

Further, a second method for forming a cross-linked site is a method of chemically bonding the multiple functional groups together.

By following the second method, the size of the cross-linked site for bonding the carbon nanotubes together becomes constant depending on the functional group to be bonded. Since a carbon nanotube has an extremely stable chemical structure, there is a low possibility that functional groups or the like other than a functional group to modify the carbon nanotube are bonded to the carbon nanotube. In the case where the functional groups are chemically bonded together, the designed structure of the cross-linked site can be obtained, thereby providing a homogeneous carbon nanotube structure.

Furthermore, the functional groups are chemically bonded together, so that the length of the cross-linked site between the carbon nanotubes can be shorter than that in the case where the functional groups are cross-linked together with a cross-linking agent. Therefore, the carbon nanotube structure is dense, and tends to readily provide an effect peculiar to a carbon nanotube.

A reaction for chemically bonding the functional groups is particularly preferably one of a condensation reaction, a substitution reaction, an addition reaction, and an oxidative reaction.

The multiple carbon nanotubes to be used in the method of manufacturing a nanotube-polymer composite of the present invention are each preferably a multi-wall carbon nanotube having high electrical conductivity. This is because when functional groups are bonded, an inner graphene sheet structure is destroyed only to a small extent, and thus the characteristics of a carbon nanotube hardly deteriorate.

The present invention can provide the composite of the carbon nanotube and the polymer having satisfactory mechanical characteristics peculiar to a carbon nanotube and having high electrical and thermal conductivity, thereby expanding the application of the nanotube-polymer composite.

BRIEF DESCRIPTION OF THE DRAWINGS

Preferred embodiments of the present invention will be described in detail based on the following figures, wherein.

DETAILED DESCRIPTION OF THE PREFERRED EMBODIMENT

Hereinafter, each of a carbon nanotube-polymer composite and a method of manufacturing the carbon nanotube-polymer composite will be described specifically through the description of the embodiments of the present invention.
[Nanotube-Polymer Composite]

A nanotube-polymer composite of the present invention includes a carbon nanotube structure having a network structure and a polymer filled in the network structure. The nanotube-polymer composite may have two forms: (1) a composite including as a filler multiple carbon nanotube structures each having a network structure dispersed in a polymer; and (2) a composite including a polymer, having a comparable contour as a carbon nanotube structure, filled in the network structure of the carbon nanotubes. In the form (1), the carbon nanotube structures may be supported on a substrate, but in the form (2), the carbon nanotube structure is preferably peeled off from a support substrate used during manufacture and then filled with the polymer. Hereinafter, the form (1) will be described mainly.

Figure 1:
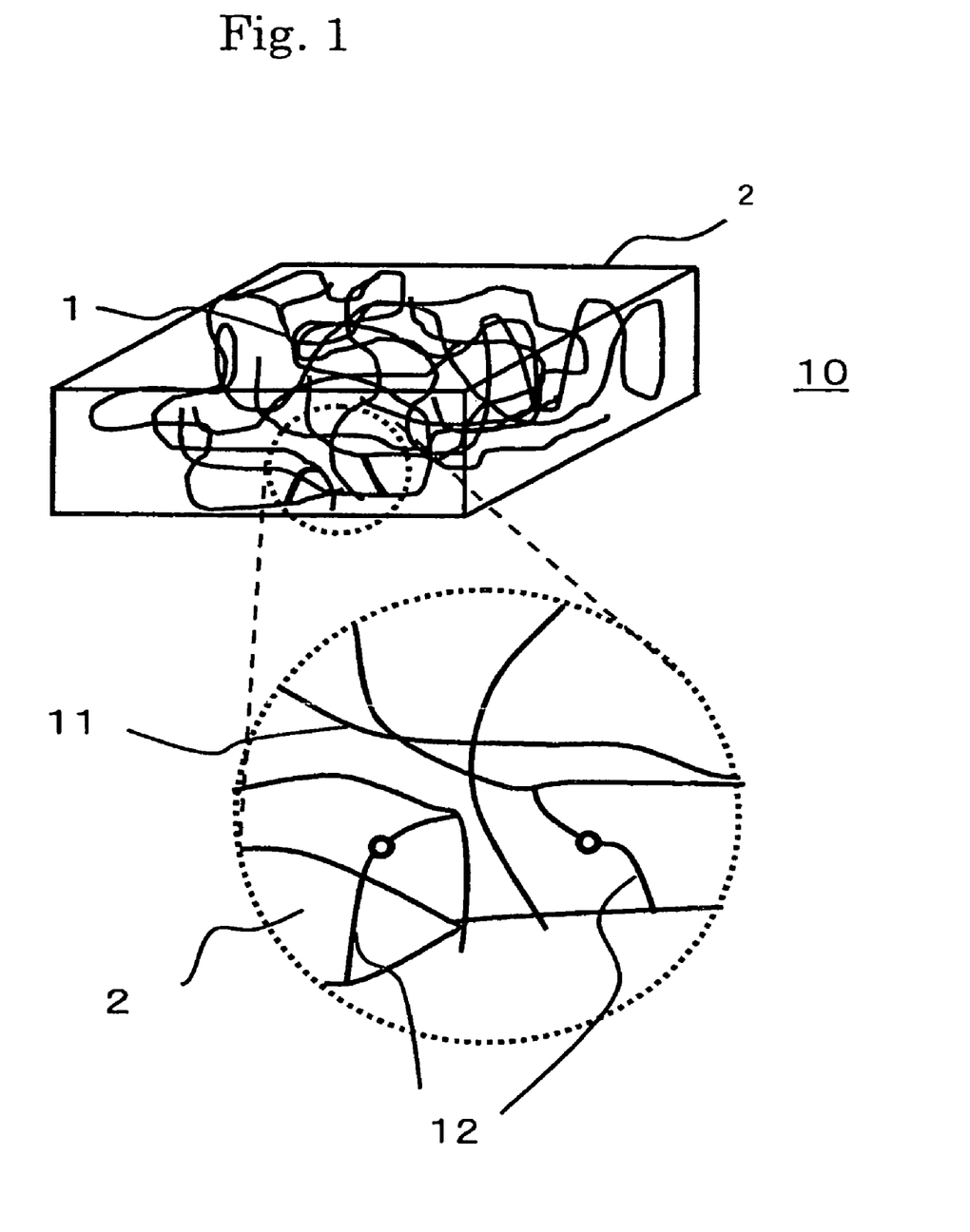
FIG. 1 is a schematic diagram showing a nanotube-polymer composite of the present invention.

FIG. 1 shows a schematic diagram of a nanotube-polymer composite 10. A carbon nanotube structure 1 is constructed by cross-linking multiple carbon nanotubes 11, and cross-linked sites 12 connect together functional groups bonded to the carbon nanotubes through chemical bonding, thereby forming a network structure. A region of the composite encircled is shown in an enlarged schematic diagram. Note that, the functional groups are significantly small with respect to lengths of the carbon nanotubes, and thus, the cross-linked portions cannot be visually observed and the carbon nanotubes are close to each other. As a result, an arrangement of the carbon nanotubes maintains a stereoscopic configuration in the carbon nanotube structure 1, to thereby prevent bundling and localization of the carbon nanotubes. Further, the carbon nanotubes are tough and flexible at the same time, and the carbon nanotube structure 1 mainly consisting of carbon nanotubes takes over such characteristics to serve as a flexible and tough filler. A composite material formed by dispersing such a carbon nanotube structure 1 in a polymer 2 can provide a polymer having improved strength and a composite having electrical or thermal conductivity of the carbon nanotubes.
<Polymer>

Examples of a polymer include various resins such as polyethylene, polypropylene, polyvinyl chloride, polyamide, polyimide, and an epoxy resin. Among the polymers, an elastomer such as butadiene rubber, acrylic rubber, or isoprene rubber is preferably used.

<Carbon Nanotube Structure>

In the present invention, the term "carbon nanotube structure" refers to a structure having a network structure constructed by mutually cross-linking multiple carbon nanotubes. Provided that a carbon nanotube structure can be formed in such a manner that carbon nanotubes are mutually cross-linked to construct a network structure, the carbon nanotube structure may be formed through any method. However, the carbon nanotube structure is preferably manufactured through a method of manufacturing a nanotube-polymer composite of the present invention described later for easy manufacture, a high-performance nanotube-polymer composite, and easy uniformization and control of characteristics.

A first structure for the carbon nanotube structure employed as a filler for a nanotube-polymer composite described later is manufactured by curing a solution (cross-linking solution) containing carbon nanotubes having functional groups and a cross-linking agent that prompts a cross-linking reaction with the functional groups, to prompt a cross-linking reaction between the functional groups of the carbon nanotubes and the cross-linking agent, to thereby form a cross-linked site. Furthermore, a second structure for the carbon nanotube structure is manufactured by chemically bonding together functional groups of carbon nanotubes to form cross-linked sites.

Hereinafter, the carbon nanotube structure in the nanotube-polymer composite of the present invention will be described by way of examples of the manufacturing method. Unless otherwise stated, the structures of cross-linked sites are not considered.

(Carbon Nanotube)

Carbon nanotubes, which are the main component in the present invention, may be single-wall carbon nanotubes or multi-wall carbon nanotubes each having two or more layers. Whether one or both types of carbon nanotubes are used (and, if only one type is used, which type is selected) may be decided appropriately taking into consideration the use of the nanotube-polymer composite or the cost.

Carbon nanotubes in the present invention include ones that are not exactly shaped like a tube, such as: a carbon nanohorn (a horn-shaped carbon nanotube whose diameter continuously increases from one end toward the other end) which is a variant of a single-wall carbon nanotube; a carbon nanocoil (a coil-shaped carbon nanotube forming a spiral when viewed in entirety); a carbon nanobead (a spherical bead made of amorphous carbon or the like with its center pierced by a tube); a cup-stacked nanotube; and a carbon nanotube with its outer periphery covered with a carbon nanohorn or amorphous carbon.

Furthermore, carbon nanotubes in the present invention may include ones that contain some substances inside, such as: a metal-containing nanotube which is a carbon nanotube containing metal or the like; and a peapod nanotube which is a carbon nanotube containing a fullerene or a metal-containing fullerene.

As described above, in the present invention, it is possible to employ carbon nanotubes of any form, including common carbon nanotubes, variants of the common carbon nanotubes, and carbon nanotubes with various modifications, without a problem in terms of reactivity. Therefore, the concept of "carbon nanotube" in the present invention encompasses all of the above.

Those carbon nanotubes are conventionally synthesized through a known method such as arc discharge, laser ablation, or CVD, and the present invention can employ any of the methods. However, arc discharge in a magnetic field is preferable from the viewpoint of synthesizing a high-purity carbon nanotube.

A diameter of carbon nanotubes used in the present invention is preferably 0.3 nm or more and 100 nm or less. A diameter of the carbon nanotubes exceeding this upper limit undesirably results in difficult and costly synthesis. A more preferable upper limit of the diameter of a carbon nanotubes is 30 nm or less.

In general, the lower limit of the carbon nanotube diameter is about 0.3 nm from a structural standpoint. However, too small a diameter could undesirably lower the synthesis yield. It is therefore preferable to set the lower limit of the carbon nanotube diameter to 1 nm or more, more preferably 10 nm or more.

The length of carbon nanotubes used in the present invention is preferably 0.1 μm or more and 100 μm or less. A length of the carbon nanotubes exceeding this upper limit undesirably results in difficult synthesis or requires a special synthesis method raising cost. On the other hand, a length of the carbon nanotubes falling short of this lower limit undesirably reduces the number of cross-link bonding points per carbon nanotube. A more preferable upper limit of the carbon nanotube length is 10 μm or less, and a more preferable lower limit of the carbon nanotube length is 1 μm or more.

The appropriate carbon nanotube content in the cross-linking solution varies depending on the length and thickness of carbon nanotubes, whether single-wall carbon nanotubes or multi-wall carbon nanotubes are used, the type and amount of functional groups in the carbon nanotubes, the type and amount of cross-linking agent or of an additive for bonding functional groups together, the presence or absence of a solvent or other additive used and, if one is used, the type and amount of the solvent or additive, etc. The carbon nanotube content in the solution should be high enough to form a satisfactory carbon nanotube structure after curing but not excessively high because the applicability deteriorates.

Specifically, the ratio of carbon nanotubes to the entire cross-linking solution excluding the mass of the functional groups is 0.01 to 10 g/l, preferably 0.1 to 5 g/l, and more preferably 0.5 to 1.5 g/l, although the ratio cannot be determined uniquely but is subject to variations as described above.

The purity of the carbon nanotubes to be used is desirably raised by purifying the carbon nanotubes before preparation of the cross-linking solution if the purity is not high enough. In the present invention, the higher the carbon nanotube purity, the better the result can be. Specifically, the purity is preferably 90% or higher, more preferably 95% or higher. Low purity causes the cross-linking agent to cross-link with carbon products such as amorphous carbon and tar, which are impurities. This could change the cross-linking distance between carbon nanotubes, and desired characteristics may not be obtained. A purification method for carbon nanotubes is not particularly limited, and any known purification method can be employed.

Such carbon nanotubes are used for the formation of a carbon nanotube structure with predetermined functional groups added to the carbon nanotubes. A preferable functional group to be added at this time varies depending on whether the carbon nanotube structure is formed through the first method or second method described above (a preferable functional group in the former case is referred to as "Functional Group 1", and a preferable functional group in the latter case is referred to as "Functional Group 2").

How functional groups are introduced into carbon nanotubes will be described in the section below titled (Method of Preparing Cross-linking Solution).

Hereinafter, components that can be used for the formation of a carbon nanotube structure will be described for the respective first and second methods.

(Case of First Method)

In the first method in which a cross-linked site is formed using a cross-linking agent, carbon nanotubes can have any functional groups to be connected thereto without particular limitations, as long as functional groups selected can be added to the carbon nanotubes chemically and can prompt a cross-linking reaction with any type of cross-linking agent. Specific examples of such functional groups include —COOR, —COX, —MgX, —X (where X represents halogen), —OR, —NR$^1$R$^2$, —NCO, —NCS, —COOH, —OH, —NH$_2$, —SH, —SO$_3$H, —R"CH$_2$OH, —CHO, —CN, —COSH, —SR, —SiR'$_3$ (In the above formulae, R, R$^1$, R$^2$, R', and R" each independently represent a substituted or unsubstituted hydrocarbon group. R, R$^1$, R$^2$, and R' are each a monovalent hydrocarbon group and are each preferably independently selected from —C$_n$H$_{2n-1}$ and —C$_n$H$_{2n+1}$ (n represents an integer of 1 to 10). Of those, a methyl group or an ethyl group is more preferable for each of R, R$^1$, R$^2$, and R'. R" is a divalent hydrocarbon group and is preferably selected from —C$_n$H$_{2n}$— (n represents an integer of 1 to 10). Of those, a methylene group or an ethylene group is more preferable for R".). Note that the functional groups are not limited to those examples.

Of those, it is preferable to select at least one functional group from the group consisting of —OH, —COOH, —COOR (In the formulae, R represents a substituted or unsubstituted hydrocarbon group. R is preferably selected from —C$_n$H$_{2n-1}$ and —C$_n$H$_{2n+1}$ (n represents an integer of 1 to 10). Of those, a methyl group or an ethyl group is more preferable.), —COX (where X represents a halogen atom), —NH$_2$, and —NCO. In that case, a cross-linking agent, which can prompt a cross-linking reaction with the selected functional group, is selected as the cross-linking agent.

In particular, —COOR(R is the same as that described above) is particularly preferable. This is because a carboxyl group can be introduced into a carbon nanotube with relative ease, because the resultant substance (carbon nanotube carboxylic acid) can be easily introduced as a functional group by esterifying the substance, and because the substance has good reactivity with a cross-linking agent.

R in the functional group —COOR is a substituted or unsubstituted hydrocarbon group, and is not particularly limited. However, R is preferably an alkyl group having 1 to 10 carbon atoms, more preferably an alkyl group having 1 to 5 carbon atoms, and particularly preferably a methyl group or an ethyl group in terms of reactivity, solubility, viscosity, and ease of use as a solvent for a cross-linking solution.

The amount of functional groups introduced cannot be determined uniquely because the amount varies depending on the length and thickness of a carbon nanotube, whether the carbon nanotube is of a single-wall type or a multi-wall type, the type of a functional group, the use of the nanotube-polymer composite, etc. From the viewpoint of the strength of the cross-linked substance obtained, namely, the strength of the carbon nanotube structure, a preferable amount of functional groups introduced is large enough to add two or more functional groups to each carbon nanotube. How functional groups are introduced into carbon nanotubes will be described in the section below titled [Method of Manufacturing Nanotube-polymer Composite].

(Cross-Linking Agent)

A cross-linking agent is an essential ingredient for the cross-linking solution. Any cross-linking agent can be used as long as the cross-linking agent is capable of prompting a cross-linking reaction with the functional groups of the carbon nanotubes. In other words, the type of cross-linking agent that can be selected is limited to a certain degree by the types of the functional groups. In addition, the conditions of curing (heating, UV irradiation, visible light irradiation, air setting, etc.) as a result of the cross-linking reaction are naturally determined by the combination of those parameters.

Specific examples of the preferable cross-linking agent include a polyol, a polyamine, a polycarboxylic acid, a polycarboxylate, a polycarboxylic acid halide, a polycarbodiimide, and a polyisocyanate. It is preferable to select at least one cross-lining agent from the group consisting of the above cross-linking agents. In that case, a functional group which can prompt a reaction with the selected cross-linking agent is selected as the functional group.

At least one functional group and at least one cross-linking agent are particularly preferably selected respectively from the group consisting of the functional groups exemplified as the preferable functional groups and the group consisting of the cross-linking agents exemplified as the preferable cross-linking agents, so that a combination of the functional group and the cross-linking agent may prompt a cross-linking reaction with each other. The following Table 1 lists the combinations of the functional group of the carbon nanotubes and the corresponding cross-linking agent, which can prompt a cross-linking reaction, along with curing conditions for the combinations.

TABLE 1

| Functional group of carbon nanotube | Cross-linking agent | Curing condition |
|---|---|---|
| —COOR | Polyol | heat curing |
| —COX | Polyol | heat curing |
| —COOH | Polyamine | heat curing |
| —COX | Polyamine | heat curing |
| —OH | Polycarboxylate | heat curing |
| —OH | Polycarboxylic acid halide | heat curing |
| —NH$_2$ | Polycarboxylic acid | heat curing |
| —NH$_2$ | Polycarboxylic acid halide | heat curing |
| —COOH | Polycarbodiimide | heat curing |
| —OH | Polycarbodiimide | heat curing |
| —NH$_2$ | Polycarbodiimide | heat curing |
| —NCO | Polyol | heat curing |
| —OH | Polyisocyanate | heat curing |
| —COOH | Ammonium complex | heat curing |
| —COOH | cis-platin | heat curing |

R represents a substituted or unsubstituted hydrocarbon group
X represents a halogen Of those combinations, preferable is the combination of —COOR (where R represents a substituted or unsubstituted hydrocarbon group and is preferably selected from —C$_n$H$_{2n-1}$ and —C$_n$H$_{2n+1}$ (n represents an integer of 1 to 10). Of those, a methyl group or an ethyl group is more preferable.) with good reactivity on the functional group side and a polyol, a polyamine, an ammonium complex, congo red, and cis-platin, which form a robust cross-linked substance with ease. The terms "polyol", "polyamine", and "ammonium complex" as used in the present invention are genetic names for organic compounds each having two or more OH groups, NH$_2$ groups, and ammonium groups, respectively. Of those, one having 2 to 10 (more preferably 2 to 5) carbon atoms and 2 to 22 (more preferably 2 to 5) OH groups is preferable in terms of cross-linkability, solvent compatibility when an excessive amount thereof is charged, treatability of waste liquid after a reaction by virtue of biodegradability (environmental suitability), yield of polyol synthesis, and so on. In particular, the number of carbon atoms is preferably lower within the above range because a gap between carbon nanotubes in the resultant carbon nanotube structure can be extremely narrowed to bring the carbon nanotubes into substantial contact with each other (to bring the carbon nanotubes close to each other). Specifically, glycerin and ethylene glycol are particularly preferable, and one or both of glycerin and ethylene glycol are preferably used as a cross-linking agent.

From another perspective, the cross-linking agent is preferably a non self-polymerizable cross-linking agent. In addition to glycerin and ethylene glycol as examples of the polyols mentioned above, butenediol, hexynediol, hydroquinone, and naphthalenediol are obviously non self-polymerizable cross-linking agents. More generally, a prerequisite for the non self-polymerizable cross-linking agent is to be without a pair of functional groups, which can prompt a polymerization reaction with each other, in itself. On the other hand, examples of a self-polymerizable cross-linking agent include one that has a pair of functional groups, which can prompt a polymerization reaction with each other (alkoxide, for example), in itself.

According to a method of manufacturing a nanotube-polymer composite of the present invention, the first method may involve: further including a solvent in the solution used in the supplying step and containing the multiple carbon nanotubes to which the functional groups are bonded and the cross-linking agent; and supplying the base body surface with the resultant solution. The cross-linking agent may also serve as the solvent depending on the type of the cross-linking agent.

Formation of a carbon nanotube structure only involves: supplying the base body surface with the multiple carbon nanotubes to which functional groups are bonded and the cross-linking agent (the supplying step in the method of manufacturing a nanotube-polymer composite of the present invention); and chemically bonding the functional groups together to form a cross-linked site (the cross-linking step in the method of manufacturing a nanotube-polymer composite of the present invention). In supplying the base body surface with the multiple carbon nanotubes to which functional groups are bonded and the cross-linking agent, the base body surface is preferably supplied with a solution (cross-linking solution) containing the carbon nanotubes, the cross-linking agent, and a solvent. In particular, the solution is preferably applied as a cross-linking application solution to form a cross-linked substance film, for a simple, low cost operation in a short period of time.

(Case of Second Method)

In the second method, a cross-linked site of a carbon nanotube structure is formed by mutually cross-linking multiple functional groups bonded to carbon nanotubes each having at least one different end through chemical bonding of the functional groups, to thereby construct a network structure. The functional groups to be bonded to the carbon nanotubes are not particularly limited as long as the functional groups can be chemically added to the carbon nanotubes and is capable of reacting with each other using some type of additive.

Specific examples of the functional group include —COOR, —COX, —MgX, —X (where X represents a halogen), —OR, —NR$^1$R$^2$, —NCO, —NCS, —COOH, —OH, —NH$_2$, —SH, —SO$_3$H, —R"CH$_2$OH, —CHO, —CN, —COSH, —SR, —SiR'$_3$ (In the above formulae, R, R$^1$, R$^2$, R', and R" each independently represent a substituted or unsubstituted hydrocarbon group. R, R$^1$, R$^2$, and R' are each a monovalent hydrocarbon group and are preferably independently selected from —C$_n$H$_{2n-1}$ and —C$_n$H$_{2n+1}$ (n represents an integer of 1 to 10). Of those, a methyl group or an ethyl group is more preferable for each of R, R$^1$, R$^2$, and R'. R" is a divalent hydrocarbon group and is preferably selected from —C$_n$H$_{2n}$— (n represents an integer of 1 to 10). Of those, a methylene group or an ethylene group is more preferable for R".). However, the functional group is not limited to those.

A reaction for chemically bonding the functional groups together is particularly preferably dehydration condensation, a substitution reaction, an addition reaction, or an oxidative reaction. The functional groups preferable for the respective reactions out of the above functional groups are exemplified below.

According to the method of manufacturing a nanotube-polymer composite of the present invention, the second method may involve: preparing a supply solution (cross-linking solution) used in the supplying step by including the multiple carbon nanotubes having the functional groups bonded and the additive as required in a solvent; and supplying the base body surface with the resultant solution.

When the reaction for chemically bonding the functional groups together is dehydration condensation, a condensation agent is preferably added as the additive. Specific examples of preferable condensation agents include an acid catalyst and a dehydration condensation agent such as sulfuric acid, N-ethyl-N'-(3-dimethylaminopropyl)carbodiimide, and dicyclohexyl carbodiimide. It is preferable to select at least one condensation agent from the group consisting of the above. In that case, the functional groups, which can prompt a reaction among the functional groups with the help of the selected condensation agent, are selected as the functional groups.

The functional groups to be used in dehydration condensation are preferably at least one functional group selected from the group consisting of —COOR(R represents a substituted or unsubstituted hydrocarbon group and is preferably selected from —C$_n$H$_{2n-1}$ and —C$_n$H$_{2n+1}$ (n represents an integer of 1 to 10). Of those, a methyl group or an ethyl group is more preferable.), —COOH, —COX (where X represents a halogen atom), —OH, —CHO, and —NH$_2$.

Examples of the functional group particularly preferable for use in dehydration condensation include —COOH. Introduction of a carboxyl group into carbon nanotubes is relatively easy, and the resultant substance (carbon nanotube carboxylic acid) has high reactivity. Therefore, functional groups for forming a network structure can be easily introduced into multiple sites of one carbon nanotube. Moreover, the functional group is suitable for formation of a carbon nanotube structure because the functional group is easily subjected to dehydration condensation. If the functional group to be used in dehydration condensation is —COOH, sulfuric acid, N-ethyl-N'-(3-dimethylaminopropyl)carbodiimide, and dicyclohexyl carbodiimide described above are particularly preferable condensation agents.

When the reaction for chemically bonding the functional groups together is a substitution reaction, a base is preferably added as the additive. A base that can be added is not particularly limited, and may be any base as long as the base is selected according to the acidity of a hydroxyl group.

Specific preferable examples of the base include sodium hydroxide, potassium hydroxide, pyridine, and sodium ethoxide. It is preferable to select at least one base from the group consisting of the above bases. In that case, functional groups, which can prompt a substitution reaction among the functional groups with the help of the selected base, are selected as the functional groups. In addition, the functional groups at this time are preferably at least one functional group selected from the group consisting of —$NH_2$, —X (where X represents a halogen atom), —SH, —OH, —$OSO_2CH_3$, and —$OSO_2(C_6H_4)CH_3$.

When the reaction for chemically bonding the functional groups together is an addition reaction, an additive is not always necessary. The functional groups at this time are preferably —OH and/or —NCO.

When the reaction for chemically bonding the functional groups together is an oxidative reaction, an additive is not always necessary either. However, an oxidative reaction accelerator is preferably added as the additive. An example of the oxidative reaction accelerator that can be suitably added is iodine. In addition, the functional groups at this time are preferably —SH.

Further, it is also possible to bond a molecule, which partially contains those functional groups, with the carbon nanotubes to be chemically bonded at a preferable functional group portion exemplified above. Even in this case, a functional group with a large molecular weight to be bonded to the carbon nanotubes is bonded as intended, enabling control of a length of the cross-linked site.

In chemically bonding the functional groups together, an additive that can form the chemical bonding among the functional groups can be used. Any additive that is capable of causing the functional groups of the carbon nanotubes to react with each other can be used as such an additive. In other words, the type of additive that can be selected is limited to a certain degree by the types of the functional groups and the reaction. In addition, the conditions of curing (heating, UV irradiation, visible light irradiation, air setting, etc.) as a result of the reaction are naturally determined by the combination of those parameters.

It is preferable to select at least two functional groups from the group consisting of the functional groups exemplified as preferable functional groups so that a combination of the selected functional groups is capable of prompting a mutual reaction. Table 2 below lists functional groups (A) and (B) of carbon nanotubes capable of prompting a mutual cross-linking reaction and the names of corresponding reactions.

TABLE 2

| Bonding site | Functional group of carbon nanotube(A) | Functional group of carbon nanotube (B) | Reaction |
| --- | --- | --- | --- |
| —COOCO— | —COOH | — | Dehydration condensation |
| —S—S— | —SH | — | Oxidative reaction |
| —O— | —OH | — | Dehydration condensation |
| —NH—CO— | —COOH | —$NH_2$ | Dehydration condensation |
| —COO— | —COOH | —OH | Dehydration condensation |
| —COO— | —COOR | —OH | Dehydration condensation |
| —COO— | —COX | —OH | Dehydration condensation |
| —CH=N— | —CHO | —$NH_2$ | Dehydration condensation |
| —NH— | —$NH_2$ | —X | Substitution reaction |
| —S— | —SH | —X | Substitution reaction |
| —O— | —OH | —X | Substitution reaction |

TABLE 2-continued

| Bonding site | Functional group of carbon nanotube(A) | Functional group of carbon nanotube (B) | Reaction |
| --- | --- | --- | --- |
| —O— | —OH | —$OSO_2CH_3$ | Substitution reaction |
| —O— | —OH | —$OSO_2(C_6H_4)CH_3$ | Substitution reaction |
| —NH—COO— | —OH | —N=C=O | Addition reaction |

R represents a substituted or unsubstituted hydrocarbon group
X represents a halogen Formation of a carbon nanotube structure only involves: supplying the base body surface with the multiple carbon nanotubes to which functional groups are bonded and the additive as required (supplying step in the method of manufacturing a nanotube-polymer composite of the present invention); and chemically bonding the functional groups together to form a cross-linked site (cross-linking step in the method of manufacturing a nanotube-polymer composite of the present invention). In supplying the base body surface with the multiple carbon nanotubes to which functional groups are bonded, the base body surface is preferably supplied with a solution (cross-linking solution) containing the carbon nanotubes and a solvent. In particular, the solution is preferably applied as a cross-linking application solution to form a cross-linked substance film, for simple formation of the nanotube-polymer composite of the present invention at a low cost and in a short period of time.

(Other Additive)

The cross-linking solution (used in both the first method and the second method) may contain various additives including a solvent, a viscosity modifier, a dispersant, and a cross-linking accelerator. A solvent is added when satisfactory applicability of the cross-linking solution is not achieved with the cross-linking agent or the additive for bonding the functional groups alone. A solvent that can be employed is not particularly limited, and may be appropriately selected according to the type of the cross-linking agent or the additive for bonding the functional groups. Specific examples of such a solvent include: organic solvents such as methanol, ethanol, isopropanol, n-propanol, butanol, methyl ethyl ketone, toluene, benzene, acetone, chloroform, methylene chloride, acetonitrile, diethyl ether, and tetrahydrofuran (THF); water; acidic aqueous solutions; and alkaline aqueous solutions. A solvent as such is added in an amount that is not particularly limited but determined appropriately by taking into consideration the applicability of the cross-linking solution.

A viscosity modifier is also added when sufficient applicability is not achieved with the cross-linking agent or the additive for bonding the functional groups alone. A viscosity modifier that can be employed is not particularly limited, and may be appropriately selected according to the type of cross-linking agent or the additive for bonding the functional groups. Specific examples of such a viscosity modifier include methanol, ethanol, isopropanol, n-propanol, butanol, methyl ethyl ketone, toluene, benzene, acetone, chloroform, methylene chloride, acetonitrile, diethyl ether, and THF.

Some of those viscosity modifiers serve as a solvent when added in a certain amount, but it is meaningless to clearly distinguish the viscosity modifier from the solvent. A viscosity modifier as such is added in an amount that is not particularly limited but determined appropriately by taking into consideration the applicability.

A dispersant is added in order to maintain the dispersion stability of the carbon nanotubes, the cross-linking agent, or the additive for bonding the functional groups in the cross-linking solution. Various known surfactants, water-soluble organic solvents, water, acidic aqueous solutions, alkaline aqueous solutions, etc. can be employed as a dispersant. However, in the present invention, a dispersant is not always necessary since components of the cross-linking solution themselves have high dispersion stability. In addition, depending on the use of the final nanotube-polymer composite of the present invention, the presence of impurities such as a dispersant in the carbon nanotube structure may not be desirable. In such a case, a dispersant is not added at all, or is added in a very small amount.

The content of the cross-linking agent or additive for bonding the functional groups in the cross-linking solution varies depending on the type of cross-linking agent (including whether the cross-linking agent is self-polymerizable or not self-polymerizable) or additive for bonding functional groups. The content also varies depending on the length and thickness of carbon nanotubes, whether single-wall carbon nanotubes or multi-wall carbon nanotubes are used, the type and amount of functional groups in the carbon nanotubes, the presence or absence of a solvent or other additive used and, if one is used, the type and amount of the solvent or additive, etc. Therefore, the content cannot be determined uniquely. In particular, for example, glycerin or ethylene glycol can also provide characteristics of a solvent because a viscosity of glycerin or ethylene glycol is not so high, and thus an excessive amount of glycerin or ethylene glycol can be added.

<Method of Preparing Cross-Linking Solution>

A method of preparing a cross-linking solution is described next. The cross-linking solution is prepared by mixing carbon nanotubes that have functional groups with a cross-linking agent that prompts a cross-linking reaction with the functional groups or an additive for bonding functional groups (mixing step). The mixing step may be preceded by an addition step in which the functional groups are introduced into the carbon nanotubes.

Use of carbon nanotubes having functional groups as starting materials starts the preparation from the mixing step. The use of normal carbon nanotubes themselves as starting materials starts the preparation from the addition step.

(Addition Step)

The addition step is a step of introducing desired functional groups into carbon nanotubes. How functional groups are introduced varies depending on the type of functional group and cannot be determined uniquely. One method involves adding a desired functional group directly. Another method involves: introducing a functional group that is easily added; and then substituting the whole functional group or a part thereof, or adding a different functional group to the former functional group, in order to obtain the target functional group. Still another method involves applying a mechanochemical force to a carbon nanotube to break or modify a very small portion of a graphene sheet on the surface of the carbon nanotube, to thereby introduce various functional groups into the broken or modified portion.

Furthermore, functional groups can be relatively easily introduced into cup-stacked carbon nanotubes, which have many defects on the surface upon manufacture, and carbon nanotubes that are formed by vapor phase growth. On the other hand, carbon nanotubes each having a perfect graphene sheet structure exert the carbon nanotube characteristics more effectively and the characteristics are easily controlled. Consequently, it is particularly preferable to use a multi-wall carbon nanotube so that an appropriate number of defects are formed on its outermost layer as a nanotube-polymer composite to bond functional groups for cross-linking while the inner layers having less structural defects exert the carbon nanotube characteristics.

Operations for the addition step are not particularly limited, and any known method can be employed. Various addition methods disclosed in JP 2002-503204 A may be employed in the present invention depending on the purpose. A description is given on a method of introducing —COOR (In the formula, R represents a substituted or unsubstituted hydrocarbon group. R is preferably selected from —$C_nH_{2n-1}$ and —$C_nH_{2n+1}$ (n represents an integer of 1 to 10). Of those, a methyl group or an ethyl group is more preferable.), a particularly desirable functional group among the functional groups listed above. To introduce —COOR (where R represents a substituted or unsubstituted hydrocarbon group) into carbon nanotubes, carboxyl groups may be added to the carbon nanotubes once (1), and then esterified (2).

(1) Addition of Carboxyl Group

To introduce carboxyl groups into carbon nanotubes, carboxyl groups are refluxed together with an acid having an oxidizing effect. This operation is relatively easy and is preferable since carboxyl groups with high reactivity can be added to carbon nanotubes. A brief description of the operation is given below.

Examples of an acid having an oxidizing effect include concentrated nitric acid, a hydrogen peroxide solution, a mixture of sulfuric acid and nitric acid, and aqua regia. Concentrated nitric acid is particularly used in concentration of preferably 5 mass % or higher, more preferably 60 mass % or higher.

A normal reflux method can be employed. The reflux temperature is preferably close to the boiling point of the acid used. When concentrated nitric acid is used, for instance, the temperature is preferably set to 120° C. to 130° C. The reflux preferably lasts for 30 minutes to 20 hours, more preferably for 1 hour to 8 hours.

Carbon nanotubes to which carboxyl groups are added (carbon nanotube carboxylic acid) are produced in the reaction liquid after the reflux. The reaction liquid is cooled down to room temperature and then is subjected to a separation operation or washing as required, thereby obtaining the target carbon nanotube carboxylic acid.

(2) Esterification

The target functional group —COOR (where R represents a substituted or unsubstituted hydrocarbon group and a preferable R is such as that described above) can be introduced by adding an alcohol to the obtained carbon nanotube carboxylic acid and dehydrating the mixture for esterification.

The alcohol used for the esterification is determined according to R in the formula of the functional group. That is, if R is $CH_3$, the alcohol is methanol, and if R is $C_2H_5$, the alcohol is ethanol. A catalyst is generally used in the esterification, and a conventionally known catalyst such as sulfuric acid, hydrochloric acid, or toluenesulfonic acid can be used in the present invention. The use of sulfuric acid as a catalyst is preferable from the viewpoint of not prompting a side reaction in the present invention.

The esterification may be conducted by adding an alcohol and a catalyst to carbon nanotube carboxylic acid and refluxing the mixture at an appropriate temperature for an appropriate time period. A temperature condition and a time period condition in this case depend on type of catalyst, type of alcohol, or the like and cannot be determined uniquely, but a reflux temperature is preferably close to the boiling point of the alcohol used. The reflux temperature is preferably in the range of 60° C. to 70° C. for methanol, for example. Further, a reflux time period is preferably in the range of 1 to 20 hours, more preferably in the range of 4 to 6 hours.

A carbon nanotube with the functional group —COOR (where R represents a substituted or unsubstituted hydrocarbon group and a preferable R is such as that described above) added can be obtained by separating a reaction product from a reaction liquid after esterification and washing the reaction product as required.

(Mixing Step)

The mixing step is a step of mixing, as required, carbon nanotubes having functional groups with a cross-linking agent prompting a cross-linking reaction with the functional groups or an additive for bonding the functional groups, to thereby prepare the cross-linking solution. In the mixing step, other components described in the aforementioned section titled [Nanotube-polymer Composite] are mixed, in addition to the carbon nanotubes having functional groups and the cross-linking agent. Then, an amount of a solvent or a viscosity modifier is preferably adjusted considering applicability, to thereby prepare the cross-linking solution (cross-linking application solution) just before supply (application) to the base body.

Simple stirring with a spatula and stirring with a stirrer of a stirring blade type, a magnetic stirrer, and a stirring pump may be used. However, to achieve higher degree of uniformity in dispersion of the carbon nanotubes to enhance storage stability while fully extending a network structure by cross-linking of the carbon nanotubes, an ultrasonic disperser or a homogenizer may be used for powerful dispersion. However, the use of a stirring device with a strong shear force of stirring such as a homogenizer may cut or damage the carbon nanotubes in the solution, thus the device may be used for a very short period of time.

A carbon nanotube structure is formed by supplying the base body surface with the cross-linking solution described above and curing the cross-linking solution. A supplying method and a curing method are described in detail in the section below titled [Method of Manufacturing Nanotube-polymer Composite].

The carbon nanotube structure in the present invention is in a state in which carbon nanotubes are networked. In detail, the carbon nanotube structure is cured into a matrix form in which carbon nanotubes are connected to each other through cross-linked sites, thereby sufficiently exerting the characteristics of a carbon nanotube itself such as high transmission characteristics. In other words, the carbon nanotube structure has carbon nanotubes that are tightly connected to each other, contains no other binders and the like, and is thus composed substantially only of carbon nanotubes, so that characteristics peculiar to a carbon nanotube are used fully.

A thickness of the carbon nanotube structure of the present invention can be widely selected from being very thin to being thick according to the use. Lowering a content of the carbon nanotubes in the cross-linking solution used (simply, lowering the viscosity by diluting) and applying the cross-linking solution as a thin film provide a very thin coat. Similarly, raising a content of the carbon nanotubes provides a thick coat. Further, repeating the application provides an even thicker coat. A very thin coat from a thickness of about 10 nm can be formed, and a thick coat without an upper limit can be formed through recoating. A possible film thickness with one coating is about 5 μm. Further, a coat may have a desired shape by pouring the cross-linking application solution having a content or the like adjusted into a mold and bonding.

In forming the carbon nanotube structure according to the first method, a site where the carbon nanotubes are mutually cross-linked, that is, the cross-linked site formed through a cross-linking reaction between the functional groups of the carbon nanotubes and the cross-linking agent has a cross-linking structure. In the cross-linking structure, residues of the functional groups remaining after the cross-linking reaction are connected together with a connecting group, which is a residue of the cross-linking agent remaining after the cross-linking reaction.

As described, the cross-linking agent, which is a component of the cross-linking solution, is preferably not self-polymerizable. A non self-polymerizable cross-linking agent provides the finally formed carbon nanotube structure constructed from a residue of only one cross-linking agent. The gap between the carbon nanotubes to be cross-linked can be controlled to a size of a residue of the cross-linking agent used, thereby providing a desired network structure of the carbon nanotubes with high duplicability. Further, multiple cross-linking agents are not present between the carbon nanotubes, thus enabling enhancement of an actual density of the carbon nanotubes in the carbon nanotube structure. Further, reducing a size of a residue of the cross-linking agent can extremely narrow a gap between each of the carbon nanotubes both electrically and physically (carbon nanotubes are substantially in direct contact with each other).

Formation of the carbon nanotube structure with a cross-linking solution prepared by selecting a single functional group of the carbon nanotubes and a single non self-polymerizable cross-linking agent results in the cross-linked site of the layer having an identical cross-linking structure (Case 1). Further, formation of the carbon nanotube structure with a cross-linking solution prepared by selecting even multiple types of functional groups of the carbon nanotubes and/or multiple types of non self-polymerizable cross-linking agents results in the cross-linked sites of the layer mainly having a cross-linking structure based on a combination of the functional group and the non self-polymerizable cross-linking agent mainly used (Case 2).

In contrast, formation of the carbon nanotube structure with a cross-linking solution prepared by selecting self-polymerizable cross-linking agents, without regard to whether the functional groups of the carbon nanotubes and the cross-linking agents are of single or multiple types, results in the cross-linked sites in the carbon nanotube structure where carbon nanotubes are cross-linked together without a main, specific cross-linking structure. This is because the cross-linked sites will be in a state where numerous connecting groups with different connecting (polymerization) numbers of the cross-linking agents coexist.

In other words, by selecting non self-polymerizable cross-linking agents, the cross-linked sites, where the carbon nanotubes of the carbon nanotube structure cross-link together, have a mainly identical cross-linking structure because a residue of only one cross-linking agent bonds with the functional groups. "Mainly identical" here is a concept including a case where all of the cross-linked sites have an identical cross-linking structure as described above (Case 1), as well as a case where the cross-linking structure based on a combination of the functional group and the non self-polymerizable cross-linking agent mainly used becomes a main structure with respect to the total cross-linked sites as described above (Case 2).

When referring to "mainly identical", a "ratio of identical cross-linked sites" with respect to the total cross-linked sites will not have a uniform lower limit defined. The reason is that a case of giving a functional group or a cross-linking structure with an aim different from formation of a carbon nanotube network may be assumed, for example. However, in order to realize high electrical or physical characteristics peculiar to carbon nanotubes with a strong network, a "ratio of identical cross-linked sites" with respect to the total cross-linked sites is preferably 50% or more, more preferably 70% or more, further more preferably 90% or more, and most preferably 100%, based on numbers. Those number ratios can be determined through, for example, a method of measuring an intensity ratio of an absorption spectrum corresponding to the cross-linking structure with an infrared spectrum.

As described, a carbon nanotube structure having the cross-linked site with a mainly identical cross-linking structure where carbon nanotubes cross-link together allows formation of a uniform network of the carbon nanotubes in a desired state. In addition, the carbon nanotube network can be constructed with homogeneous, satisfactory, and expected electrical or physical characteristics and high duplicability.

Further, the connecting group preferably contains hydrocarbon as a skeleton thereof. "Hydrocarbon as a skeleton" here refers to a main chain portion of the connecting group consisting of hydrocarbon, the main portion of the connecting group contributing to connecting together residues of the functional groups of carbon nanotubes to be cross-linked remaining after a cross-linking reaction. A side chain portion, where hydrogen of the main chain portion is substituted by another substituent, is not considered. Obviously, it is more preferable that the whole connecting group consists of hydrocarbon.

The hydrocarbon preferably has 2 to 10 carbon atoms, more preferably 2 to 5 carbon atoms, and further more preferably 2 to 3 carbon atoms. The connecting group is not particularly limited as long as the connecting group is divalent or more.

In the cross-linking reaction of the functional group —COOR (where R represents a substituted or unsubstituted hydrocarbon group, and a preferable R is such as that described above) and ethylene glycol, exemplified as a preferable combination of the functional group of carbon nanotubes and the cross-linking agent, the cross-linked site where multiple carbon nanotubes are mutually cross-linked becomes —COO(CH$_2$)$_2$OCO—.

Further, in the cross-linking reaction of the functional group —COOR (where R represents a substituted or unsubstituted hydrocarbon group, and a preferable R is such as that described above) and glycerin, the cross-linked site where multiple carbon nanotubes are mutually cross-linked becomes —COOCH$_2$CHOHCH$_2$OCO— or —COOCH$_2$CH(OCO—)CH$_2$OH if two OH groups contribute to the cross-linking, and the cross-linked site becomes —COOCH$_2$CH(OCO—)CH$_2$OCO— if three OH groups contribute to the cross-linking.

As has been described, in the nanotube-polymer composite of the present invention, the carbon nanotube structure formed through the first method has a network structure composed of multiple carbon nanotubes connected to each other through multiple cross-linked sites. Thus, contact or arrangement of carbon nanotubes remains stable, unlike a mere carbon nanotube dispersion film. Therefore, the carbon nanotube structure stably exerts characteristics peculiar to carbon nanotubes including: electrical characteristics such as high electron- or hole-transmission characteristics; physical characteristics such as thermal conductivity and toughness; and light absorption characteristics.

On the other hand, in forming the carbon nanotube structure through the second method, a site where the multiple carbon nanotubes are mutually cross-linked, that is, a cross-linked site formed by a cross-linking reaction among the functional groups of the multiple carbon nanotubes has a cross-linking structure in which residues of the functional groups remaining after a cross-linking reaction are connected to each other. In this case as well, the carbon nanotube structure has carbon nanotubes connected to each other through a cross-linked site in a matrix form, thereby easily exerting the characteristics of carbon nanotubes itself such as high electron- and hole-transmission characteristics. That is, the carbon nanotube structure has carbon nanotubes that are tightly connected to each other, contains no other binders and the like, and is thus composed substantially only of carbon nanotubes.

Further, the cross-linked sites are formed through directly reacting the functional groups with each other, thus enabling enhancement of the actual density of the carbon nanotubes of the carbon nanotube structure. Further, reducing a size of a functional group can extremely narrow a gap between each of the carbon nanotubes both electrically and physically, thereby easily exerting the characteristics of the carbon nanotube itself.

Further, cross-linked sites are formed by chemical bonding of the functional groups together, and thus, the carbon nanotube structure has a mainly identical cross-linking structure. Therefore, a uniform network of carbon nanotubes can be formed into a desired state. Further, the carbon nanotube structure can be constructed with homogeneous, satisfactory, and expected electrical and physical characteristics and high duplicability.

A layer of other than the carbon nanotube structure may be formed in the composite of the present invention. For example, placing an adhesive layer between the base body surface and the carbon nanotube structure for enhancing adhesiveness therebetween is preferable for improving the adhesive strength of the carbon nanotube structure. A method of forming an adhesive layer and other details will be explained in the section titled [Method of Manufacturing Nanotube-polymer Composite].

A specific shape and the like of the above-described nanotube-polymer composite of the present invention will be made clear in the following section titled [Method of Manufacturing Nanotube-polymer Composite]. Note that the descriptions below show merely examples and are not to limit specific aspects of the nanotube-polymer composite of the present invention.

[Method of Manufacturing Nanotube-Polymer Composite]

A method of manufacturing a composite of the present invention is a method suitable for manufacturing the nanotube-polymer composite of the present invention described above. Specifically, the method includes: (A) a supplying step of supplying a base body with a solution (cross-linking solution) containing multiple carbon nanotubes having functional groups; (B) a cross-linking step of mutually cross-linking the multiple carbon nanotubes through chemical bonding of the functional groups together to form a carbon nanotube structure having a network structure; (C) an impregnating step of impregnating the network structure with a polymer liquid; and (D) a combining step of combining the carbon nanotube structure and the polymer by curing the polymer liquid.

Hereinafter, details of the respective steps in the method of manufacturing a nanotube-polymer composite of the present invention will be described.

(A) Supplying Step

In the present invention, the "supplying step" is a step of supplying a surface of a base body such as a slide glass with a solution containing carbon nanotubes having functional groups.

The supplying method is not particularly limited, and any method can be adopted from a wide variety of methods to apply the cross-linking solution (cross-linking application solution) to the base body surface. For example, the solution may be simply dropped or spread with a squeegee or may be applied through a common application method on the base body. Examples of common application methods include spin coating, wire bar coating, cast coating, roll coating, brush coating, dip coating, spray coating, and curtain coating.

(B) Cross-Linking Step

In the present invention, the "cross-linking step" is a step of forming the carbon nanotube structure 1 (FIG. 1) having a network structure by mutually cross-linking the multiple carbon nanotubes through chemical bonding of the functional groups after supplying the cross-linking solution.

An operation carried out in the cross-linking step is naturally determined according to the combination of the functional groups and cross-linking agent or additive for bonding the functional groups together. A combination of thermosetting functional groups and cross-linking agent employs heating the cross-linking solution with various heaters or the like. A combination of functional groups and a cross-linking agent that are cured by UV rays employs irradiating the cross-linking solution with a UV lamp or leaving the cross-linking solution under the sun. A combination of air setting functional groups and cross-linking agent only employs letting the cross-linking solution stand still. "Letting the cross-linking solution stand still" is deemed as one of the operations that may be carried out in the cross-linking step of the present invention.

Heat curing (polyesterification through an ester exchange reaction) is conducted for the case of a combination of a carbon nanotube, to which the functional group —COOR (where R represents a substituted or unsubstituted hydrocarbon group and a preferable R is such as that described above) is added, and a polyol (among them, glycerin and/or ethylene glycol). Heating causes an ester exchange reaction between —COOR of the esterified carbon nanotube carboxylic acid and R'—OH (where R' represents a substituted or unsubstituted hydrocarbon group) of the polyol. As the reaction progresses multilaterally, the carbon nanotubes are cross-linked until a network of carbon nanotubes connected to each other constructs a carbon nanotube structure 1.

To give an example of conditions preferable for the above combination, the heating temperature is specifically set to preferably 50° C. to 500° C., more preferably 150° C. to 200° C. The heating time period for the above combination is specifically set to preferably 1 minute to 10 hours, more preferably 1 to 2 hours.

(C) Impregnating Step

In the present invention, the "impregnating step" is a step of providing the nanotube structure with a polymer liquid by dropping the polymer liquid onto the nanotube structure or immersing the nanotube structure in the polymer liquid.

(D) Combining Step

The nanotube-polymer composite is formed by impregnating the carbon nanotube structure 1 with the polymer liquid and then curing the polymer liquid through polymerization or the like of a polymer. A polymerization method for the polymer liquid may employ a known method of manufacturing a polymer as appropriate according to the polymer liquid used as a raw material. Any method of combining a polymer with a nanotube structure may be employed as long as the method provides a composite having a structure shown in FIG. 1, and examples of the method further include a method of dispersing a nanotube structure in a polymer liquid and then applying the dispersion to a base body. The obtained nanotube-polymer composite has a structure of the nanotube structure 1 filled in the polymer 2.

Hereinafter, the present invention will be described more specifically by way of examples. However, the present invention is not limited to the following examples.

Example 1

Nanotube-Polymer Composite Employing Glycerin Cross-Linked Multi-Wall Carbon Nanotube Structure (A) Supplying Step (Addition Step)

Figure 2:
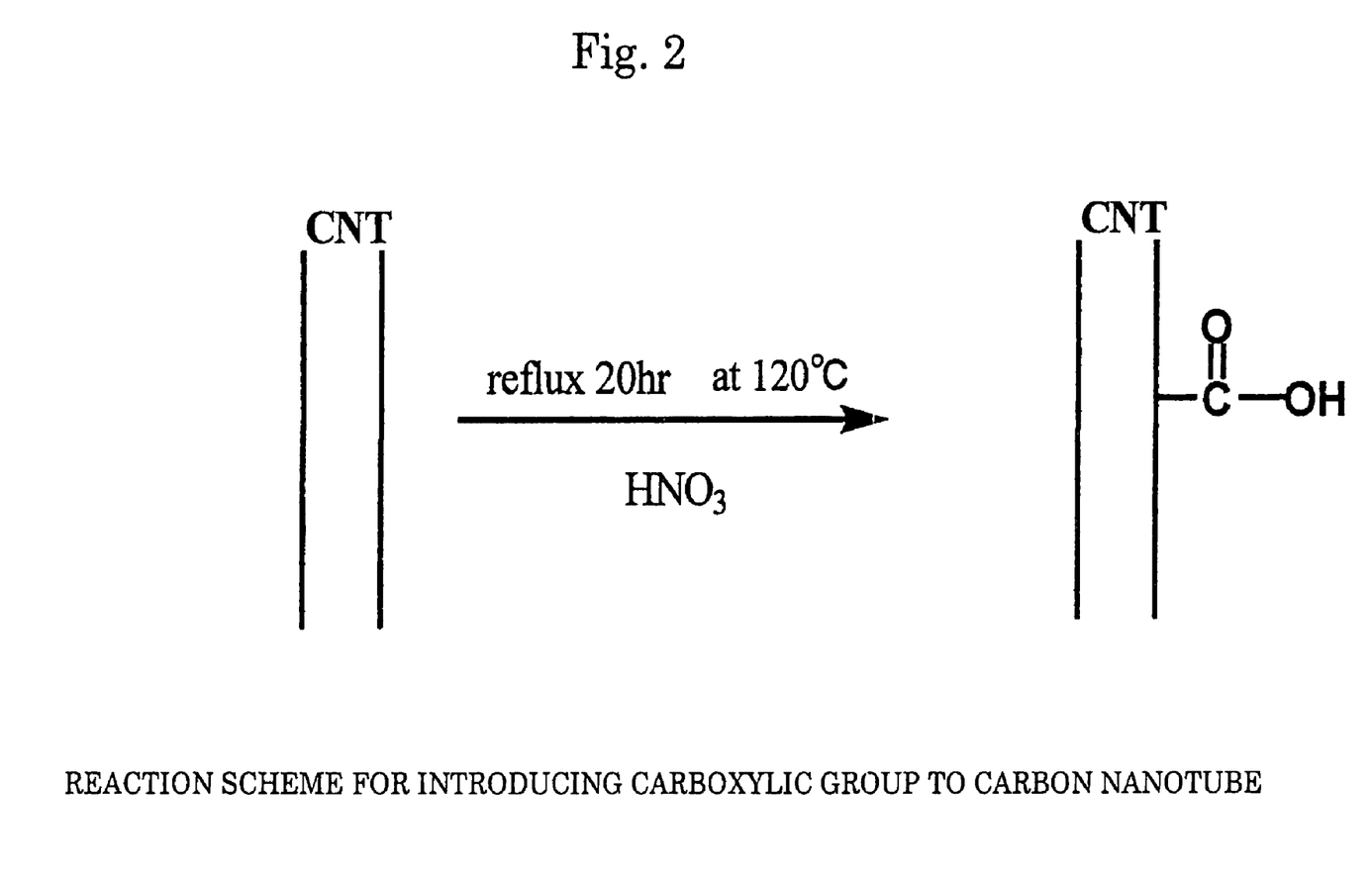
FIG. 2 shows a reaction scheme for synthesis of carbon nanotube carboxylic acid in (Addition Step) of Example 1.

30 mg of multi-wall carbon nanotube powder (purity: 90%, average diameter: 30 nm, average length: 3 μm, available from Science Laboratories, Inc.) was added to 20 ml of concentrated nitric acid (60 mass % aqueous solution, available from Kanto Kagaku) for reflux at 120° C. for 20 hours, to synthesize carbon nanotube carboxylic acid. A reaction scheme of the above is shown in FIG. 2. In FIG. 2, a carbon nanotube (CNT) portion is represented by two parallel lines (the same applies for other figures relating to reaction schemes).

The temperature of the solution was returned to room temperature, and the solution was centrifuged at 5,000 rpm for 15 minutes to separate a supernatant liquid from a precipitate. The recovered precipitate was dispersed in 10 ml of pure water, and the dispersion liquid was centrifuged again at 5,000 rpm for 15 minutes to separate a supernatant liquid from a precipitate (the above process constitutes one washing operation). This washing operation was repeated five more times, and finally, a precipitate was recovered.

<Esterification>

Figure 3:
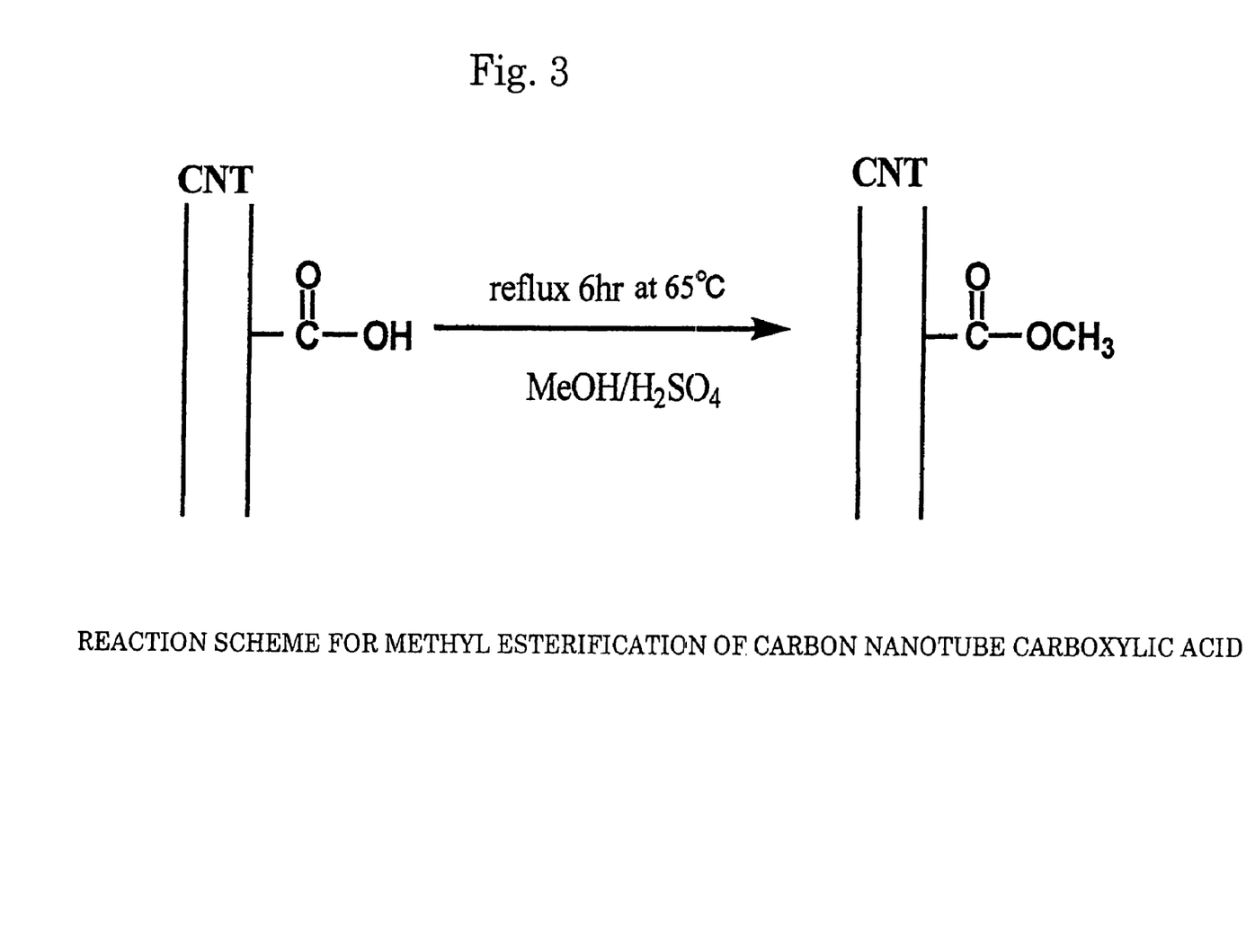
FIG. 3 shows a reaction scheme for esterification in (Addition Step) of Example 1.

30 mg of the carbon nanotube carboxylic acid prepared in the above step was added to 25 ml of methanol (available from Wako Pure Chemical Industries, Ltd.). Then, 5 ml of concentrated sulfuric acid (98 mass, available from Wako Pure Chemical Industries, Ltd.) was added to the mixture, and the whole was refluxed at 65° C. for 4 hours for methyl esterification. The reaction scheme is shown in FIG. 3.

After the temperature of the solution had been returned to room temperature, the solution was filtered to separate a precipitate. The precipitate was washed with water, and was then recovered.

(Mixing Step)

10 mg of the carbon nanotube carboxylic acid methyl esterified in the above step was added to 5 ml of glycerin (available from Kanto Kagaku), and the whole was mixed using an ultrasonic disperser. Further, the mixture was added to 10 ml of methanol as a viscosity modifier.

(Applying Step)

About 0.1 ml of the obtained cross-linking application solution was dropped and applied onto an SiO$_2$/Si substrate with a Pasteur's pipette.

(B) Cross-Linking Step

Figure 4:
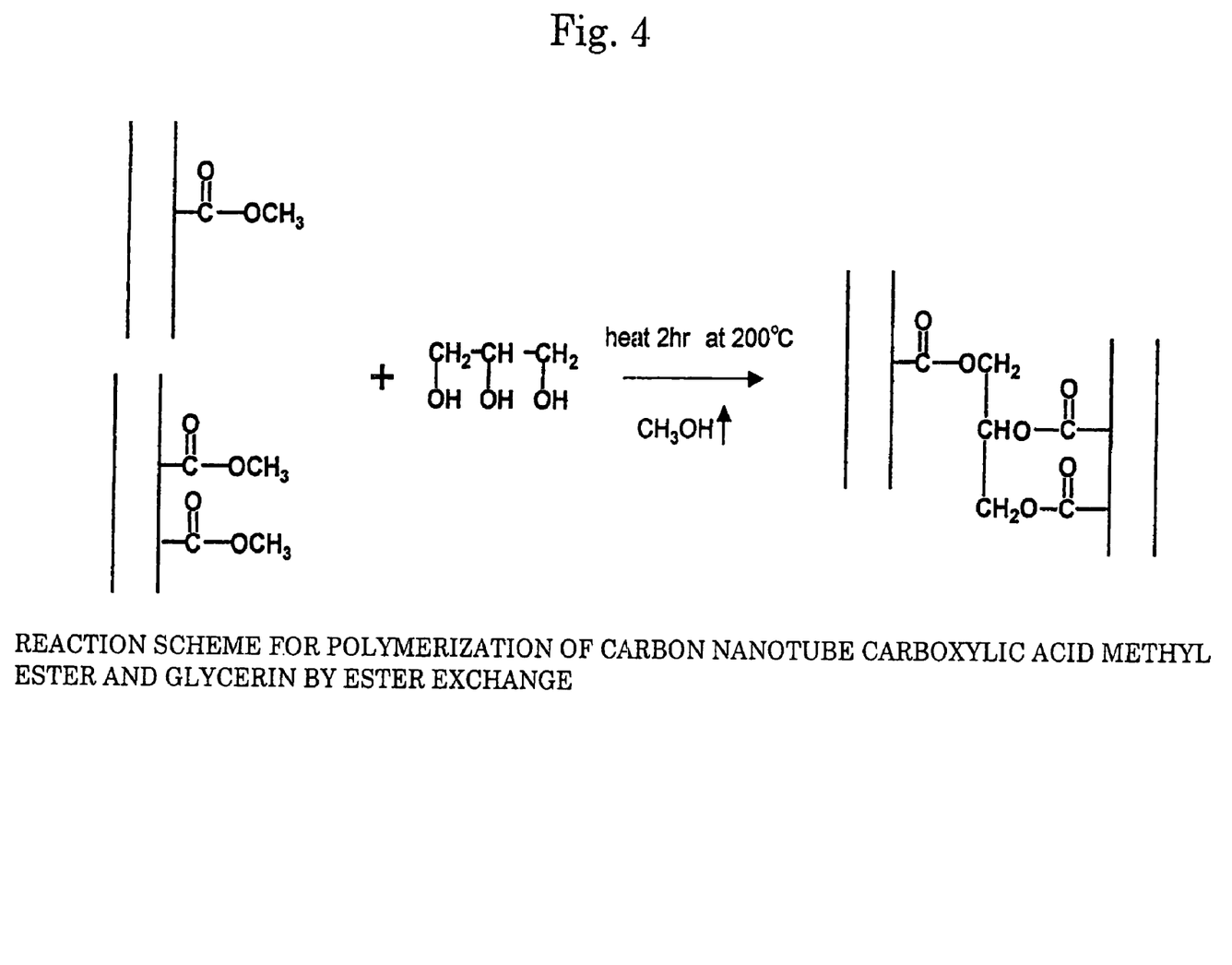
FIG. 4 shows a reaction scheme for cross-linking through an ester exchange reaction in (Cross-linking Step) of Example 1.

As described above, the substrate to which the cross-linking application solution of Example 1 was applied was heated at 200° C. for 2 hours for polymerization through an ester exchange reaction, thereby forming a network structure (carbon nanotube structure). The reaction scheme is shown in FIG. 4.

(C) Impregnating Step

The obtained carbon nanotube structure was impregnated with a polyimide resin (Rikacoat PN-20, available from New Japan Chemical Co., Ltd.) by dropping about 0.1 ml of the resin.

(D) Combining Step

The substrate was heated at 200° C. for 20 minutes to cure the resin, thereby providing a nanotube-polyimide resin composite.

Example 2

The carbon nanotube structure obtained in the same manner as in Example 1 was impregnated with an epoxy resin (Araldite, available from Ciba Specialty Chemicals, Switzerland) by dropping and curing about 0.1 ml of the epoxy resin, thereby providing a nanotube-epoxy resin composite.

Carbon nanotubes are known to burn off when a large current is passed therethrough in an atmosphere containing oxygen, and there is an upper limit to a current that can be passed through the carbon nanotubes, that is, to a current density in an atmosphere containing oxygen. However, the composite of the polymer and the nanotube structure of the present invention can shield the nanotube from oxygen and can raise the upper limit of the current density, thereby providing a nanotube-polymer composite capable of passing through a larger current. Further, bending strength of each nanotube-polymer composite was enhanced compared to that of the resin alone, preventing breaking by bending.

What is claimed is:

1. A composite comprising a carbon nanotube structure and a polymer, wherein:
    the carbon nanotube structure has a network structure constructed by curing a solution containing multiple carbon nanotubes to which multiple functional groups are bonded, forming a cross-linked site through chemical bonding of the multiple functional groups bonded to the carbon nanotubes;
    the polymer comprises one polymer selected from the group consisting of polyethylene, polypropylene, polyvinyl chloride, polyamide, polyimide, and an epoxy resin and is present in the network structure in the gaps created by crosslinking the multiple functional groups bonded to the carbon nanotubes; and
    the cross-linked site has a chemical structure selected from the group consisting of —COO(CH$_2$)$_2$OCO—, —COOCH$_2$CHOHCH$_2$OCO—, —COOCH$_2$CH(OCO—)CH$_2$OH, and —COOCH$_2$CH(OCO—)CH$_2$OCO—.

2. A composite according to claim 1, wherein:
    the cross-linked site has a structure constructed by cross-linking the multiple functional groups together through a cross-linking agent in the solution; and
    the cross-linking agent is not self-polymerizable.

3. A composite according to claim 1, wherein the cross-linked site is formed through chemical bonding of the multiple functional groups together.

4. A composite according to claim 3, wherein a reaction that forms the chemical bonding comprises one reaction selected from the group consisting of a condensation reaction, a substitution reaction, an addition reaction, and an oxidative reaction.

\* \* \* \* \*